United States Patent [19]

Jensen

[11] Patent Number: 4,639,012

[45] Date of Patent: Jan. 27, 1987

[54] AIRBORNE FOLDING WHEELCHAIR

[75] Inventor: Tom M. Jensen, Everett, Wash.

[73] Assignee: The Boeing Company, Seattle, Wash.

[21] Appl. No.: 851,611

[22] Filed: Apr. 14, 1986

[51] Int. Cl.[4] .............................. B62B 7/06

[52] U.S. Cl. .............................. 280/642; 280/648; 280/650; 280/47.4; 297/130; 297/417

[58] Field of Search .............. 297/130, 131, 331, 417, 297/429, 433; 280/641, 642, 648, 650, 47.34, 47.4

[56] References Cited

U.S. PATENT DOCUMENTS

| | | | |
|---|---|---|---|
| 751,448 | 2/1904 | Barschow | 280/642 |
| 2,115,257 | 4/1938 | Felsher | 297/130 |
| 2,509,103 | 5/1950 | Lewis et al. | 297/130 X |
| 2,615,725 | 10/1952 | Person | 280/642 X |
| 2,685,325 | 8/1954 | Webster | 280/642 X |

*Primary Examiner*—John J. Love
*Assistant Examiner*—Michael Mar
*Attorney, Agent, or Firm*—H. Gus Hartmann; B. A. Donahue

[57] ABSTRACT

A wheelchair for transporting a physically handicapped person down the narrow aisle of a commercial passenger airplane. The wheelchair comprises a fixed back frame structure having a pair of rear caster wheels mounted to the lower end thereof and a pair of front wheels mounted on an extendable front wheel frame assembly which includes a foot rest member at the front end thereof. The rear caster wheels provide directional control. The wheelchair can be manipulated into any of the following modes: (1) a folded arrangement that can be stowably secured by a plurality of catches against a vertical wall in the passenger compartment of an aircraft or the like; (2) with the wheelchair assembly still secured to the wall a seat pan is pulled down against a seat return spring and is usable as a flight attendant's seat; and (3) the folded wheelchair is completely detached from the plurality of retaining catches and fully extended to function as a wheelchair with a pair of handles extending rearwardly for an assistant's use.

10 Claims, 9 Drawing Figures

AIRBORNE FOLDING WHEELCHAIR

CROSS REFERENCE TO RELATED APPLICATION

This application is copending with Ser. No. 811,068, filed Dec. 19, 1985 and assigned to the Boeing Company.

BACKGROUND OF THE INVENTION

This invention relates to the combination of a flight attendant's seat in a passenger airplane and a means for permitting a wheelchair confined person, ease in transportation; and more particularly, this invention relates to a folding wheelchair assembly which at one stage functions as a wall supported folding seat arrangement for use by a flight attendant.

Airline passengers requiring a wheelchair are generally boarded first on an airplane, with the assistance of flight attendants and transferred from a conventionally designed wheelchair to a designated seating area that can accommodate a wheelchair adjacent thereto. Once aboard the airplane the handicapped passenger is pretty much restricted to the confines of his or her seat. Therefore, commercial passenger airplanes have an in-flight need to accommodate handicapped passengers that are confined to a wheelchair and to provide some means onboard the airplane for handicapped persons to leave their seat and go down narrow aisles to use the lavatory facilities, with or without assistance from flight attendants. It is virtually impossible to maneuver a conventionally sized wheelchair down the narrow aisle of a passenger compartment in a commercial airliner; and in the event of an aircraft emergency requiring the evacuation of all passengers, it is extremely difficult to evacuate an invalid person without the assistance of a wheelchair.

Generally, there is no wheelchair onboard a commercial passenger airplane for use by handicapped passengers that can be maneuvered down the aisle of the passenger compartment. Also, public transportation vehicles generally lack equipment for mobility of disabled persons requiring a wheelchair. There is no doubt that passengers requiring the assistance of a wheelchair would feel a sense of relief in using lavatory facilities if a wheelchair could be made that could maneuver down the narrow aisle with the assistance of an attendant. The interior size and shape of public transportation aircraft, vehicles, ships, trains, etc. are primarily dictated by cost i.e., by the lowest seat cost per mile; and this generally results in narrow aisles, cramped lavatories, limited stowage volume, etc., which in all, result in very little consideration for the travel mobility of handicapped persons and their need for greater space accommodations. Known folding type wheelchairs have to be stowed in special compartments and take up valuable space which is of major concern to the airlines: and where do you stow the generally folding type of wheelchair aboard an airplane without taking up valuable revenue space.

Airline flight attendants or stewardesses, are required to be seated and restrained with a seat belt during takeoff or landing operation of the aircraft and when the aircraft is flying through turbulent weather conditions. Sometimes they occupy a passenger type seat but in most instances, they occupy a seat which is located in a passageway or area requiring passenger ingress or egress. Typically, this seat is secured to a vertical bulkhead for structural support and generally folds up automatically when unoccupied.

SUMMARY OF THE INVENTION

The invention relates to a wheelchair that can be compactly folded into an assembly which is approximately sixteen inches in width and four inches in depth; and this compact assembly, when mounted adjacent to an aisle in the passenger compartment of an airliner, provides adequate bypass clearance.

The onboard wheelchair provides the means for permitting a handicapped person to leave his seat on a plane, train or other conventional public conveyance, with the assistance of an attendant who can maneuver the wheelchair and its occupant down the aisle and into a seat or lavatory.

The wheelchair when folded and secured to a wall or vertical bulkhead, also functions in one embodiment as a flight attendant's seat. Both the wheelchair embodiment and the flight attendant's seat embodiment are compactly foldable for stowage; and the relatively small amount of stowage space required for the compactly folded assembly, makes this invention useful on other public transportation vehicles, e.g., trains, busses, ships, etc.

The seating space available onboard a passenger airplane for use by a flight attendant, is sometimes such that it is located in a thruway area which requires clearance during passenger ingress or egress; and at these locations, it is necessary that the attendant's seat be automatically folded when unoccupied in order to provide adequate bypass clearance.

An object of the invention is to provide a means onboard a commercial passenger airplane for the transportation of disabled persons to-and-from the airplane as well as throughout the interior aisles of the passenger compartment.

Another object is to provide a wheelchair that is narrow enough for maneuvering down the aisle so that a wheelchair bound person can leave his seat with the assistance of a flight attendant.

Another object is to provide a coompactly foldable unit which provides the dual function: of a flight attendant's seat embodiment which is crash safety secured to vertical structure of the aircraft for occupancy by the flight attendant; and a wheelchair embodiment when the unit is removed from the wall support and unfolded to the wheelchair configuration.

An advantage of the invention is that both the wheelchair embodiment and the flight attendant's seat embodiment, are foldable in a front-to-back sequence from the wheelchair configuration into a compact unit having an approximate overall width of sixteen inches and a depth of approximately four inches. This compactly foldable unit makes the invention useful for other types of transportation means, e.g., trains, busses, ships, etc.

Another advantage is that the invention serves the dual function of a flight attendant's seat in one embodiment and a handicapped person's wheelchair in a second embodiment; and onboard an airplane there is a non-interferring time-of-use relationship between the flight attendant and the handicapped person.

DESCRIPTION OF THE PREFERRED EMBODIMENTS

Figure 1:
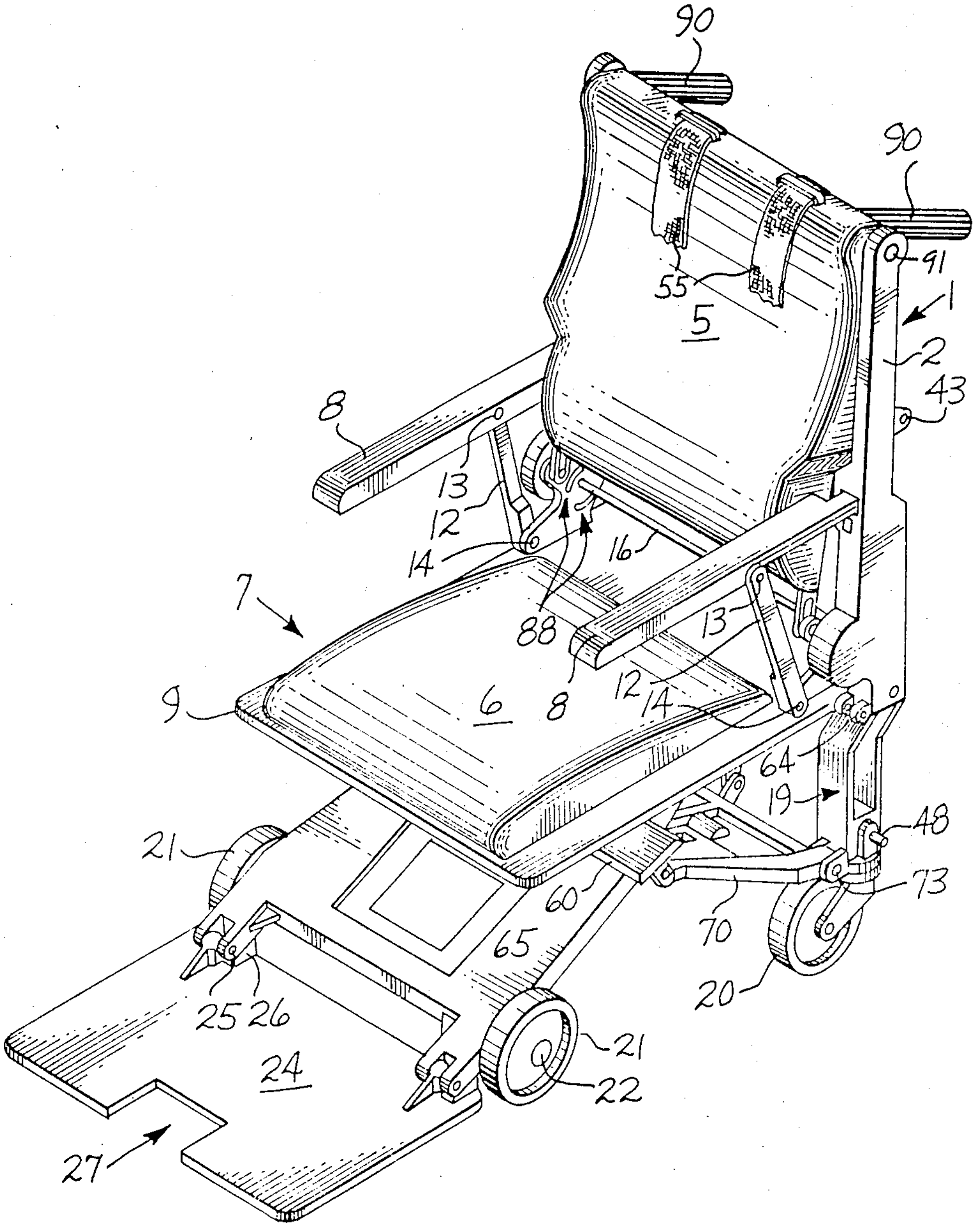
FIG. 1 is an isometric projection of the wheelchair embodiment of the invention.

The wheelchair embodiment of the invention is illustrated in the following figures: the isometric projection of FIG. 1; the side view of FIG. 2; and the front view of FIG. 3.

The wheelchair has a back frame assembly 1, comprising: a pair of vertically elongated side frame members 2; horizontal transverse frame members 91, 16, 75, 70; and a backrest frame structure 4 secured to the pair of vertical side frame members 2 on opposite parallel sides thereof. The frame members 2, 91, 16 and 4, integrally form a rigid unitary main structural back frame assembly 1 for the wheelchair embodiment.

A contoured backrest cushion 5 is removably inserted into the seat back frame assembly 1. The backrest cushion 5 has a top-to-bottom tapering contour which is thick at the top, decreasing in thickness and then increasing in thickness for the intermediate section, so as to exhibit a concave appearance when viewed from the side, as shown in FIG. 2; and then increasing in thickness to a maximum near the bottom, adjacent to where a seated occupant's lumbar region would be. The contour of the backrest cushion 5 complements a front-to-rear contour of the seat pan cushion 6 of the seat assembly 7, such that when the seat assembly 7 is compactly folded, as shown in the side view of FIG. 5, there is a contour mating of the seat cushion 6 and the backrest cushion 5; thus making the stowed arrangement as compact as possible, with minimal protrusion into an adjacent passageway.

Figure 2:
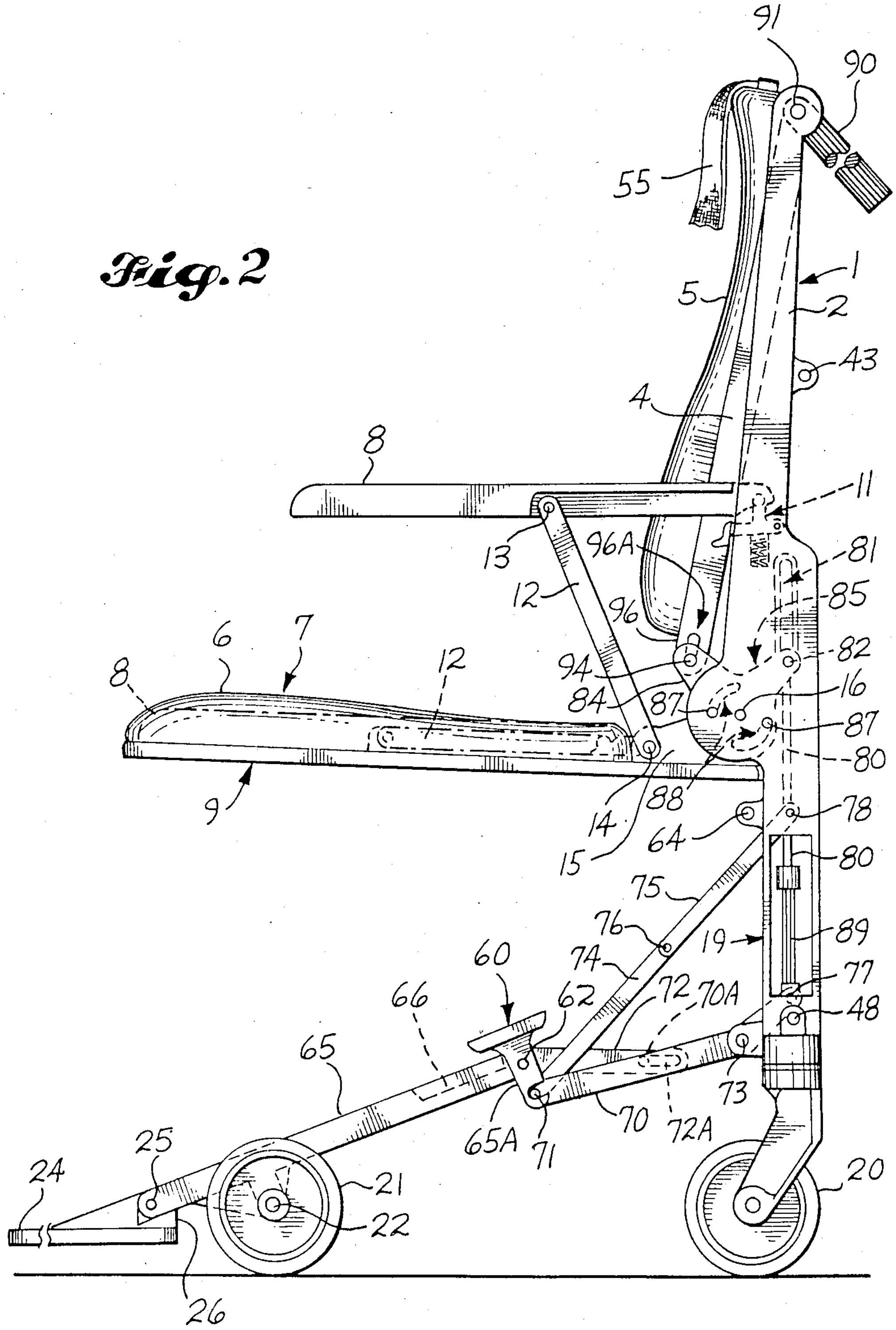
FIG. 2 is a side elevational view of the wheelchair embodiment shown in FIG. 1.
Figure 4:
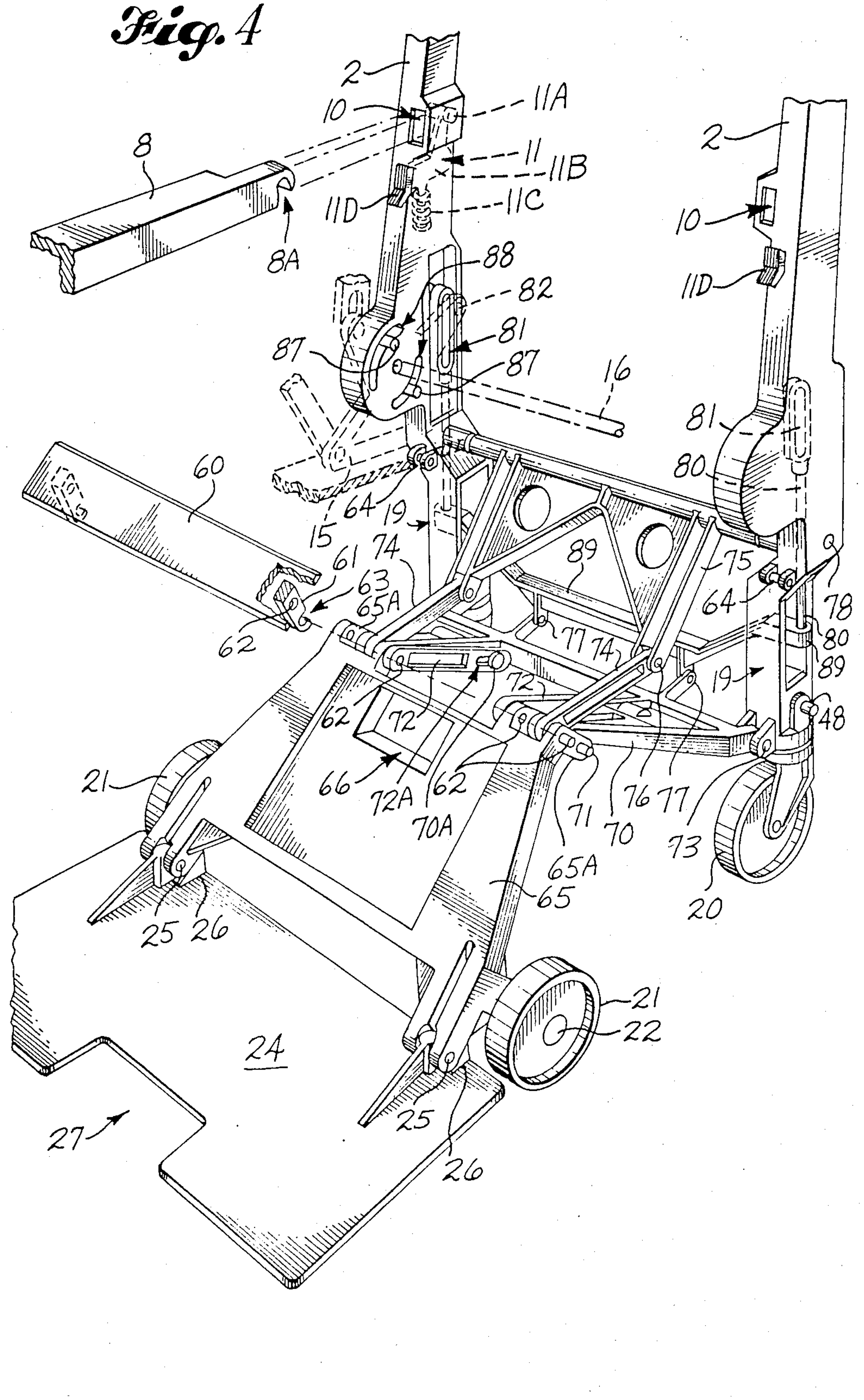
FIG. 4 is the lower portion, of the wheelchair embodiment shown in FIG. 1 with the seat and backrest removed to expose the front wheels extension mechanism.

When the seat assembly 7 is lowered for occupancy, side armrests 8 remain folded down against the side of the seat pan cushion 6 by a spring bias about pivot 14, as shown by the dash-dot outline in FIG. 2. For the wheelchair configuration, the side armrests 8 are raised from their retracted position whereat they are retained by spring biased pivot pins 14 on the seat pan frame 9 adjacent to the seat cushion 6 and as shown in FIG. 4, the rear ends of armrests 8 are inserted into slots 10 of a locking device 11. The armrest locking device 11 comprises: a locking pin 11A formed integral with a contoured member 11B which through a spring biased means 11C, forces the locking pin 11A into a detent 8A in the rear end of the armrests 8 as it is inserted into the slot 10. To release the armrest 8 from the locking device 11, a knob 11D is pushed down against the force of the spring biasing means 11C; thereby, removing the locking pin 11A from its engagement with the detent 8A in the armrest 8 and permitting the withdrawal of the armrest 8 from the slot 10. Each of the side armrests 8 has a support link 12 which is utilized for bracing the side armrests 8 in a horizontal position for the seated occupant. The upper end of each support link 12 is pivotally connected at 13 to an intermediate location on a side armrest 8 and from there the support link 12 extends downward and rearward to pivotally connect at its lower end at pivot 14 to a seat side frame member 15 which forms part of the seat assembly 7. The seat assembly 7, will be more clearly described infra, and is connected at its aft end, through pivot 16, to the back frame assembly 1.

The lower portion of the back frame assembly 1, i.e., below the seat attachment pivot 16, forms the rear support legs 19 of the wheelchair. Mounted to the lower end of the rear support legs 19 are castered wheels 20 which aid in maneuvering the wheelchair in the aisle.

Beneath the extended seat assembly 7 and supportably mounted to the rear support legs 19, is a folding linkage mechanism for extending or retracting a pair of front wheels 21 of the wheelchair embodiment. This front wheel folding linkage mechanism is supportably mounted from the rear support legs 19 of the back frame assembly 1, as will be more clearly described infra.

A footrest panel 24 projects forward from the front wheels 21 in a generally horizontal orientation for use by a wheelchair occupant. The rear section of the footrest panel 24 is rotatably mounted between the front wheels 21 on pivot axis 25. Abutment stop means 26 are incorporated adjacent to the pivotal connection 25 of the footrest panel 24, to limit downward rotation to a horizontal position.

Figure 6:
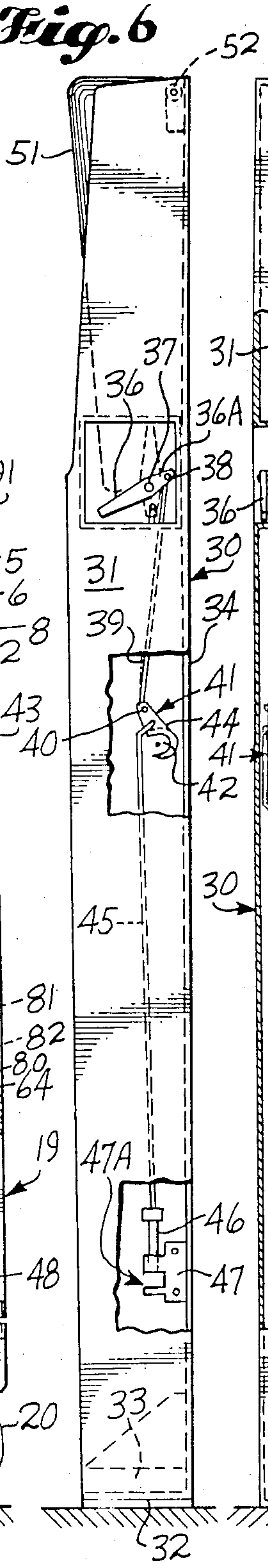
FIG. 6 is a side elevational view of an upright, wall supported frame assembly for receiving the wheelchair embodiment in the folded arrangement depicted in FIG. 5.
Figure 7:
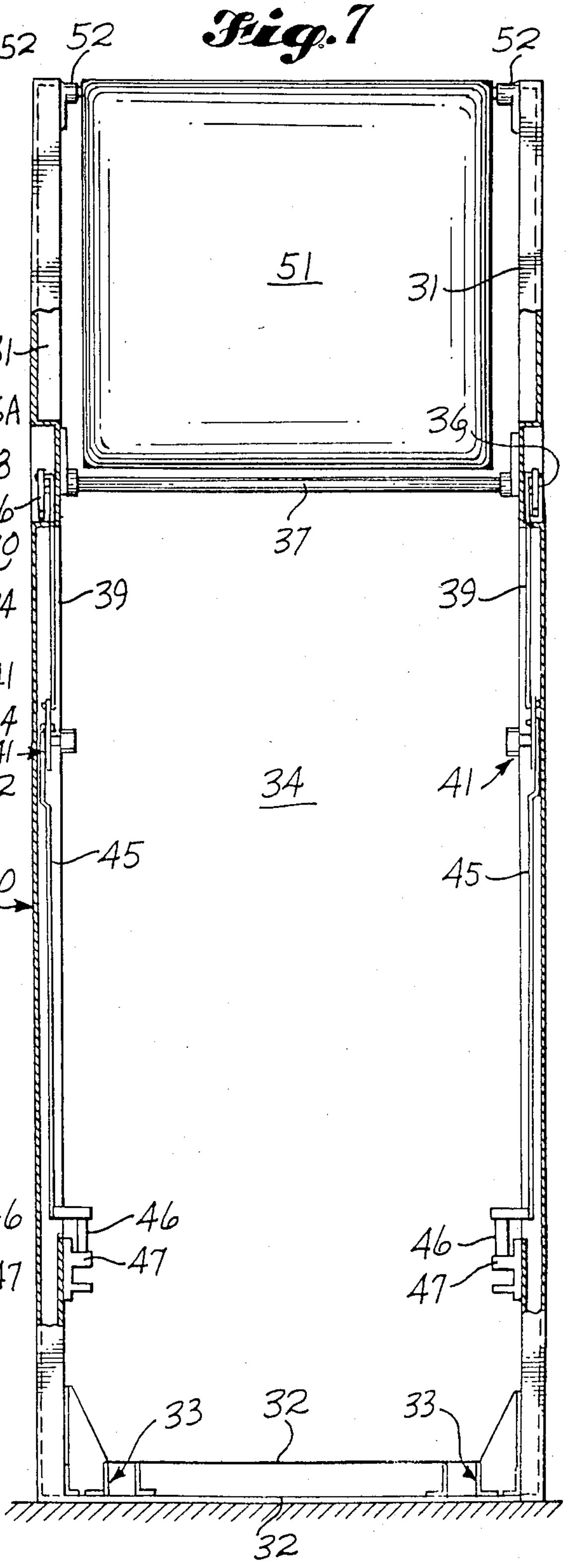
FIG. 7 is a front elevational view of FIG. 6.
Figure 5:
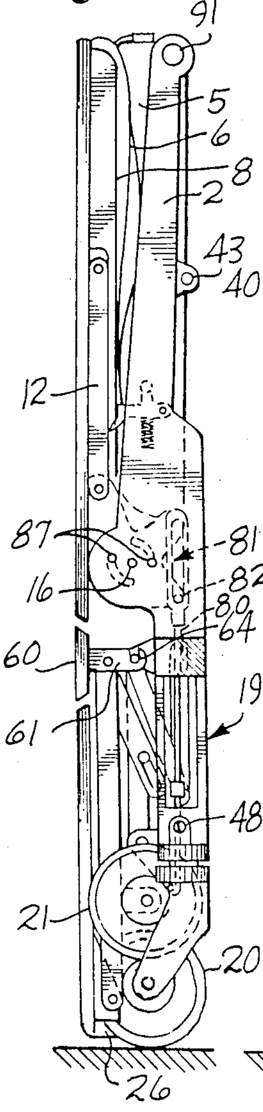
FIG. 5 is a side elevational view of the wheelchair embodiment in a completely folded arrangement.
Figure 8:
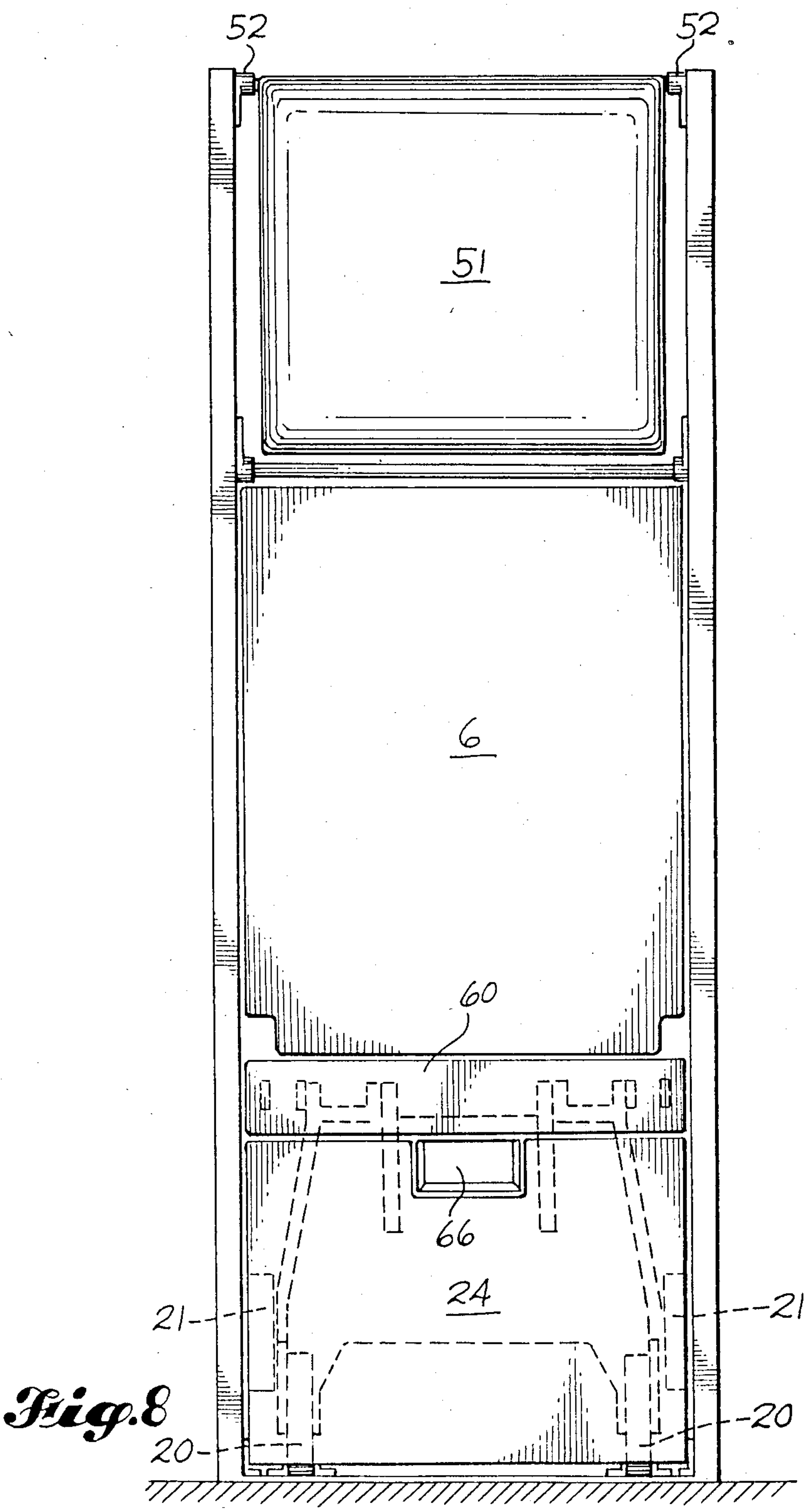
FIG. 8 is the front elevational view of FIG. 7 with the folded wheelchair embodiment of FIG. 5 stowed therein.

FIGS. 5 and 8 show the combined embodiments, of the wheelchair and the flight attendant's seat, in a compactly folded assembly; and this combination is stowed within a frame enclosure 30 which is shown in FIGS. 6 and 7. The frame enclosure 30 comprises: vertically parallel side frame members 31; a lower transverse member 32 having wheel guides 33 for aligning the rear caster wheels 20 when the wheelchair assembly is backed into and foldably inserted into the frame enclosure 30 for stowage; and a back panel 34 secured to the vertical side frame members 31 for forming a structurally rigid frame enclosure 30 which is fixedly attached to a wall or bulkhead of the aircraft for structural support.

For removably attaching the folded wheelchair assembly to the wall mounted frame enclosure 30, a series of fastening devices are attached to the vertically parallel side frame members 31; and these fastening devices comprise: interconnected handles 36, a hook latch 41 and a slide bolt latch 46–47.

Referring to FIGS. 6 and 7, the handle 36 is mounted for rotation about a fixed pivot transverse rod 37 in the side frame members 31, and the opposite end of handle 36 has an arm 36A which is pivotally connected at 38 to the upper end of a vertical link 39. The lower end of link 39 is pivotally connected at 40 to the hook latch 41 which is pivotally mounted for rotation about axis 42 to the side frame members 31 and rotatably engages, as shown in FIG. 5, a pin 43 which is fixedly attached to the wheelchair side frame members 2. Also connected to the hook latch 41 at 44, is the upper end of a lower vertical link 45 which is connected at its lower end to the slide bolt 46 which insertably engages a catch 47 fixedly attached to the side frame members 31. The catch 47 has a detent or opening 47A for insertably receiving a pin 48, shown in FIG. 5, which is fixedly attached to rear support legs 19.

To fasten the folded wheelchair, shown in FIG. 5, into the wall supported frame enclosure 30, shown in FIGS. 6 and 7, the handle 36 is initially in the horizontal position; this positions the opening of the hook latch 41 and the opening 47A of the slide bolt catch 46–47, for receiving pins 43 and 48 of the wheelchair. After the rear caster wheels 20 are properly aligned in the wheel guides 33 and the folded wheelchair is backed into the frame enclosure 30, the handle 36 is rotated upward about pivot 37 thus pushing down on links 39 and 45; thereby, rotating hook latch 41 about pivot point 42 and encircling pin 43, and lowering slide bolt 46 into its catch 47 after pin 48 has been inserted into the opening 47A. The folded wheelchair is then locked into the frame enclosure 30 where it can now be utilized as a flight attendant's seat by merely lowering the seat portion to a horizontal position for occupancy.

For unfastening the folded wheelchair from the wall supported frame enclosure 30, referring to FIGS. 5–8, the handle 36 is rotated downward and the locking procedure is reversed. However, when the wheelchair is removed, the cushioned headrest 51 does not come with the wheelchair but remains with the wall attached frame enclosure 30. The upper portion of the headrest cushion 51 is pivotally connected by spring biased pivot pins 52 to the frame enclosure 30 for forward and upward rotation about pins 52 which permits access to a life vest stowed within cushion 51.

Figure 3:
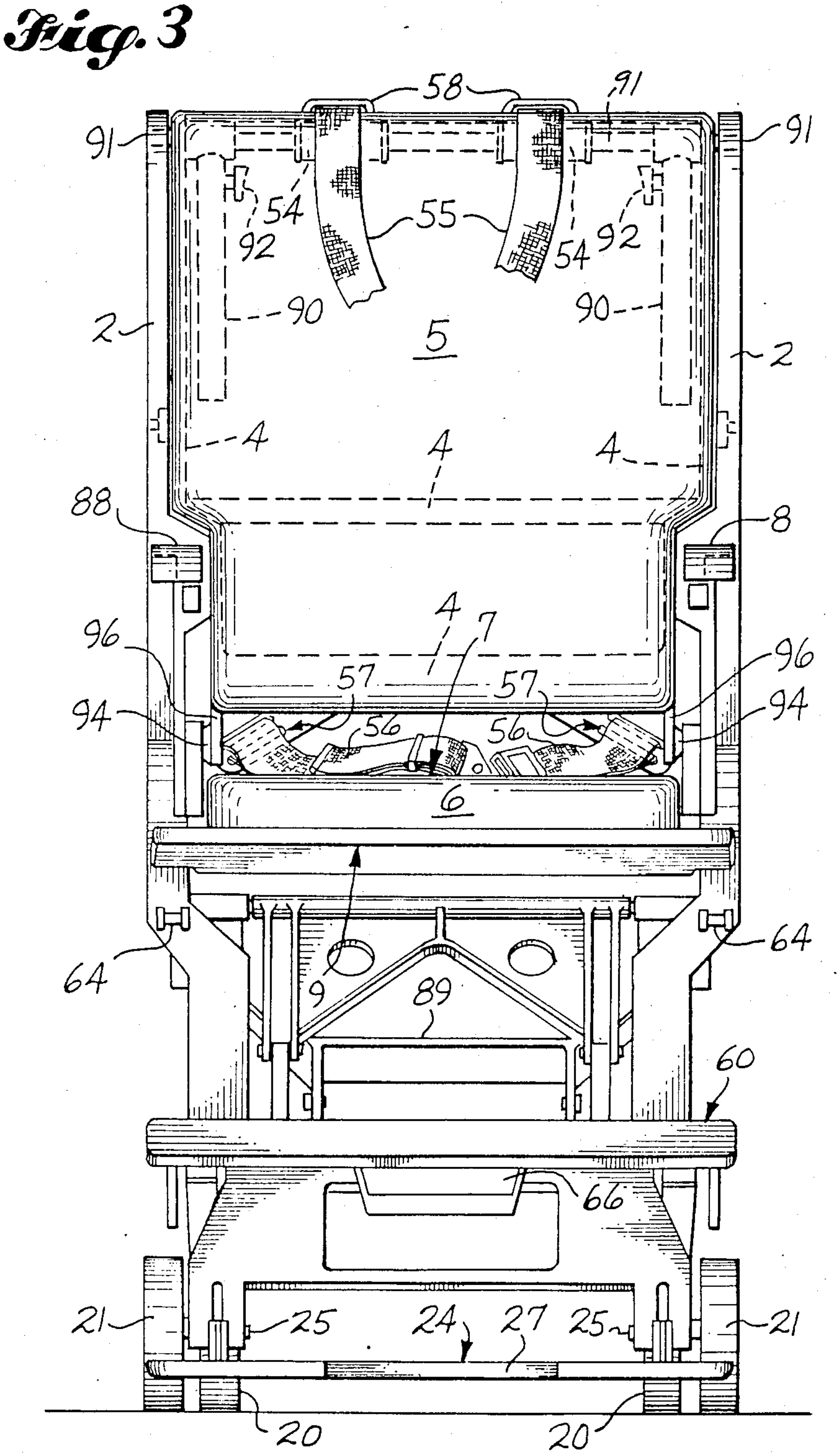
FIG. 3 is a front elevational view of the wheelchair shown in FIG. 1.
Figure 9:
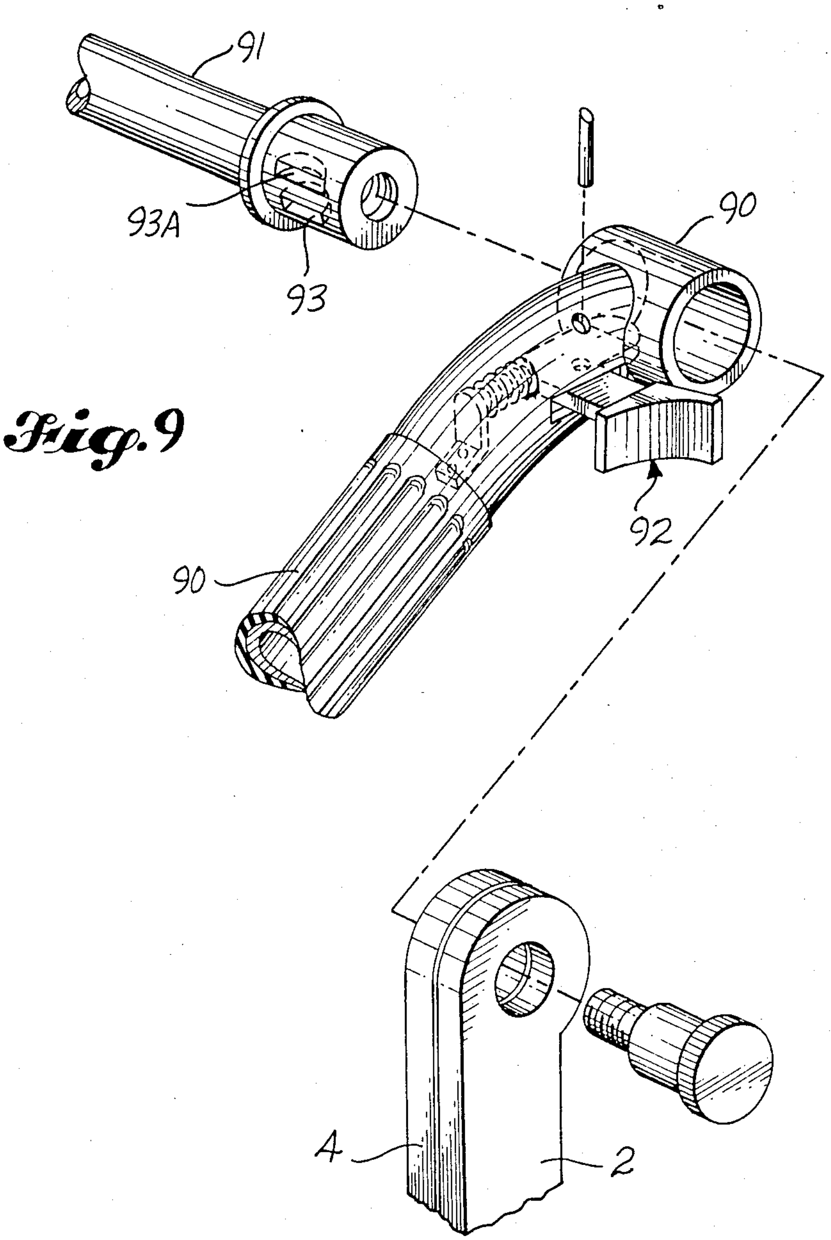
FIG. 9 is an expanded isometric projection in enlarged detail of a wheelchair assist handle and its dual position locking mechanism.

Referring to FIG. 3, the shoulder straps 55 and the inertia reels 54 are attached to rod 91 which functions as the upper horizontal transverse member for the wheelchair back frame assembly. Rod 91 also serves as the upper pivotal attachment for the seat backrest panel 4; and as shown in FIG. 9, the assistant's handles 90 are connected thereto. The seat belt 56 and the shoulder straps 55 remain attached to the wheelchair when it is removed from the frame enclosure 30.

After the compactly folded wheelchair assembly is removed from the wall supported frame enclosure 30, a folded linkage mechanism beneath the seat pan frame 9, is actuated by a transverse bar 60 for unfolding and extending the front wheels 21 forwardly from the back frame 1, for ground rolling support of the wheelchair. To unfold the front wheels linkage support mechanism, a person's hand is inserted through the cutout 27 in the folded footrest panel 24 and into the recess or indentation 66 in the forward support frame 65 of the front wheels 21. An instruction placard is displayed in the recess 66. The transverse bar 60 is grasped for pulling out. The bar 60 is approximately the full width of the wheelchair and comprises arms 61 near each end at right-angles thereto; said arms 61 being pivotally connected at 62 to the upper end of the front wheels forward support frame 65; and said arms 61 having a catch slot 63 for engaging a horizontal pin 64 fixed forward to the rear support legs 19, above the rear caster wheels 20. By pulling forward on the lower edge of the bar 60 and rotating it up and about pivot 62, the catch slot 63 on the arms 61 disengages from the horizontal pin 64 and the folded front wheels linkage mechanism is unlocked for extension. After the bar 60 has become disengaged from the horizontal pin 64, continued forward pulling on the bar 60 will fully extend the linkage mechanism, as shown in FIG. 2, to a locked position; whereat, the front wheels 21 are fully extended and supported from the rear legs 19 of the back frame structural assembly 1. FIGS. 1 and 4 depict the front wheels extension linkage mechanism at a partially extended position.

The front wheels 21 are maintained in the extended position, shown in FIG. 2, by the linkage mechanism locked in the following manner. The front wheels 21 are rotatably connected at 22 to a lower portion of forward support frame 65 and the upper portion of forward support frame 65 is prevented from rotating relative to aft support frame 70, about pivotal connection 71, by a first locking means. The first locking means is formed by a triangular truss arrangement comprising: a first segment formed between pivots 70A, 71: a second segment formed between pivots 71, 62, and a third segment formed between pivots 62, 70A by a brace link 72 having a slot 72A at one end thereof.

To prevent the aft support frame 70, for the front wheels 21, from rotating upwardly about pivot 73, a second locking means is utilized comprising an overcenter linkage arrangement of links 74 and 75 which are spring biased to an overcenter locking position at interconnection 76.

When the front wheels linkage extension mechanism is unfolded and locked for the wheelchair configuration, the seat assembly 7 will remain in the down or horizontal position; because, as the aft support frame 70 for the front wheels 21, is extendably rotated forward and down about pivot 73, the aft support frame 70 has an aft extending arm that pivotally connects at 77 to the lower end of a transverse bar 89 and will push the transverse bar 89 upwardly. The outer ends of transverse bar 89 are connected to the lower end of a vertical rod 80 which also will be pushed upwardly by the transverse bar 89. The rod 80 has at its upper end a slot 81 and the lower end of the slot 81 engages pin 82 of the seat pan frame crank arm 85; thereby, lowering the seat to the down position. The seat will remain in the down position and will not fold up on its own because the slot 81 in the vertical rod 80 aids in locking the seat in the down position. As the rod 80 moves up, the pin 82 bottoms in the slot 81 and this keeps the seat from coming up.

The armrests 8 remain folded against the sides of the seat pan cushion 6 when the seat assembly 7 is lowered in combination with the front wheels extension mechanism; and the armrests 8, as shown in FIG. 4, have to be raised and their aft ends inserted into slot 10 and locked, for use in the wheelchair configuration. When one or both of the armrests 8 are folded onto the seat pan frame 9, a person can slide into the seat sideways which may be of some advantage to a certain type of physical handicap.

An occupant restraint system is provided for the wheelchair embodiment, as shown in FIG. 3, and comprises: an adjustable seat belt 56 which is anchored to backrest frame structure 4 at slots 57; and upper shoulder restraints 55 attached through inertia reels 54 to rod 91.

For assisting a wheelchair occupant, a pair of handles 90 are pivotally mounted on rod 91 to the vertical side frame members 2. As shown in FIG. 9, the handles 90 incorporate a locking device 92 which enables the handles 90 to be locked in two positions 93, 93A: a stowed position 93 against the sides of the back frame structure, and a second position 93A where the handles are rotated up and about rod 91 approximately 45 from their stowed position. This 45 position is more comfortable for an assistant than a horizontal position, because it is at a more normal grasping position for the assistant's hands. Also, the less room that the handles take by sticking out the better.

In studies done with handicapped persons utilizing an aircraft's lavatory facilities, many problems had to be overcome. The area outside the lavatory door or the aisle area between and across the aisle lavatory doors arrangement, was approximately 25 inches wide; and in trying to position a wheelchair into the doorway of a lavatory, which doorway was approximately 18 inches wide, the attendant had to angle the wheelchair into the doorway. From this angled location, the handicapped person had to extricate himself from the wheelchair by whatever means were available, such as bars, handles, etc., to assist him in entering the lavatory, turning around and seating himself upon the commode. The reverse procedure, in returning to the wheelchair, was equally difficult.

For the flight attendant's seat embodiment of the invention, the back frame structure 1 is locked within the frame enclosure 30 which is fixedly attached to a wall support structure of the aircraft. When the attendant's seat is lowered and occupied, the downward and rearward forces exerted by an occupant upon the seat assembly 7 and against the back frame structure 1, are reacted into the frame enclosure 30 via the series of fastening devices shown in FIG. 6 comprising, hook latch 41 and slide bolt latch 46–47. The actuating handle 36 through interconnecting linkage to the fastening devices, attachably locks the back frame structure 1 within the frame enclosure 30.

The flight attendant's seat embodiment must be connectively secured to structural supports that are designed to provide a high degree of safety for a flight attendant occupant, especially during turbulent weather conditions or in the event of a crash landing.

The flight attendant's seat assembly 7 comprises the rectangular seat pan frame structure 9 which retainably supports the seat cushion 6. The seat pan frame could also be manufactured as a single die cast part as opposed to an assembly of parts.

The rectangular seat pan frame structure 9 is rotatably supported at its aft end, through pivot 16, to the back frame structure 1; and this pivotal connection is spring biased to rotate the flight attendant's seat upwardly about pivot 16 to fold the seat compactly against the back assembly to a retracted and stowed position, as shown in FIG. 5, when the seat assembly 7 becomes unoccupied. The spring biasing means comprises a torsion spring housed within the circular bulge of the back frame side members 2 adjacent to the pivot rod 16. It is recommended that the side armrests 8 not be used when the attendant's seat embodiment is being utilized because they would prevent the seat bottom from returning to the retracted position when unoccupied.

Seat bottom stop pins 87, travel in a circular arc slot guide 88 which limits the downward rotational movement of the seat 7 to a generally horizontal seating position.

Cooperating with the articulated seat pan frame structure 9 is a mechanism that causes the bottom of seat backrest 5 to be moved forwardly into a sloping seating position when the seat pan 9 is folded down into a seating position.

Referring to FIG. 2, the seat pan frame 9 has, at its aft end, two integral crank arms 84 and 85. Crank arm 84 has its swinging end connected through a pin 94 to a slot 96A formed in the lower end of the backrest side frame member 96. The upper end of the backrest assembly is connected through pivotal rod 91 to the back frame assembly 1. Crank arm 85 has its swinging end connected through a pin 82 to a slot 81 formed in the upper end of a vertical rod 80.

When the attendant's seat embodiment is selected, the front wheels extension linkage mechanism remains in the folded configuration as shown in FIG. 5 and the rod 80 is in the down position, thereby pin 82 is free to move in the slot 81, permitting the seat to fold up when unoccupied due to its spring biasing about pivot 16 to the up position. The vertical rods 80 form part of the seat autofold lockout mechanism that prevents the application of the spring biased closing force to the seat pan frame 9 as shown in FIG. 2 when the seat is incorporated into the wheelchair embodiment.

Referring to FIG. 2, as the attendant's seat assembly 7 is pulled down to a horizontal position for occupancy, crank arm 84 rotates forwardly and downwardly, and through the pin 94 and slot 96A connection, the lower end of the backrest frame 96 moves forward to form a sloping seating position as the upper end of the backrest frame 4 rotates about rod 91. Also, when the seat is lowered to the position for occupancy, the front wheels extension linkage mechanism remains in a rearward retracted position as shown in FIG. 5, such that the front wheels 21 are in vertical alignment with the rear wheels 20 and there are no legs or wheels protruding into the adjacent passageway. The downward force exerted upon the seat assembly 7 is reacted through the rear legs 19, the wheels 20 and into the floor of the aircraft.

An occupant restraint system, as shown in FIG. 3, is utilized for the attendant's seat embodiment and comprises an adjustable seat belt 56 and adjustable shoulder harness straps 55. The seat belt 56 is anchored through slotted holes 57 to the backrest frame structure 4 and the shoulder straps 55 slip through nonbinding strap guide brackets 58 located in a gap between the lower portion of the head rest cushion 51 and the upper portion of the back cushion 5. The shoulder straps 55 are routed to the inertia-reels 54 which are mounted to upper horizontal transverse rod 91.

The compactly folded embodiment of the invention is illustrated in the side view of FIG. 5. The wheelchair of the present invention folds into a compact unit for stowage, in a front-to-back sequence; whereas, known folding wheelchairs are generally folded sideways and take up too much space for stowage in the passenger compartment of an airplane.

The preferred method for returning the wheelchair into a compactly folded assembly for insertion into the wall attached frame enclosure 30, comprises: returning the assist handles 90 as shown in FIG. 9 to their stowed position using latch 92, disengaging detent 93A plus rotating the assist handles downward until latch 92 falls into detent 93; moving the back of the wheelchair rearwardly, as shown in FIGS. 5–8, toward the frame enclosure 30 and as it is backed straight in, the rear castered wheels 20 align themselves into a fore-to-aft direction for ease of insertion into the wheel guides 33 which are provided at the bottom of the frame enclosure 30 and rest on the floor of the aircraft compartment.

As the wheelchair is pushed back into the frame enclosure 30, it inserts itself into a rotating hook latch 41 and a spring biased slide bolt latch 46–47. The operating handle 36 is then pulled up for a positive locking actuation of the latches 41 and 46–47; thereby locking the seat back frame 1 into the frame enclosure 30.

With the seat back frame 1 positively locked within the frame enclosure 30, the wheelchair assembly is now set for the folding sequence.

First, the armrest release mechanism, shown in FIG. 4, is operated to disengage the side armrests 8 from the slots 10 so that the armrests can be folded down onto the seat pan frame 9 and against the sides of the seat cushion 6.

Second, the footrest or footpan 24 is rotated up about pivot 25 and folded back on top of the front wheels forward support frame 65.

In order to fold the front wheels support linkage, the pivotal connection 76 of links 74 and 75, has to be first pushed in and then bar 60 can be pulled forward and up. This sequence is necessary because, the pivot 76 which interconnects links 74 and 75, provides an overcenter linkage locking arrangement, with a torque spring for restraining the links 74 and 75 in an overcenter locking arrangement to prevent retraction of the front wheels 21. Therefore, in order to fold the brace, comprising links 74 and 75, the spring biased pivot 76 which maintains links 74 and 75 in their extended overcenter locking alignment, has to be pushed in.

The front wheels 21 normally remain in contact with the floor as the wheelchair is pushed back into the frame enclosure 30; and as the front wheels support linkage mechanism is being folded, the front wheels 21 are raised to their rearward retracted position above and in vertical alignment with the rear wheels 20, as shown in FIG. 5.

By pulling on bar 60 in an outward and upward direction, pivot 62, which interconnects links 65 and 72, will pull slotted link 72 such that it will travel forward relative to link 70 and this will cause the slot 72A in link 72 to move forward with respect to the fixed pin 70A on link 70: i.e., pin 70A will travel to the other end of slot 72A in link 72. Link 72, in combination with links 65A and 70, form a triangular truss locking arrangement that prevents the front wheels forward support frame 65 from rotating about pivot 71.

Slotted link 72 functions as a compression link when activated by the weight of a wheelchair occupant; and if link 72 were missing, the front wheel forward support frame 65 would rotate upward about pivot 71 and the wheelchair occupant would fall forward. Therefore, by pulling forward and up on pivot 62 with the bar 60, the kinematic locking function of slotted link 72 is released.

As the forward end of link 70 is rotated upwardly about pivot 73, the rearward extension arm of link 70 at pivotal connection 77, is pulled down and this also pulls down on seat return lock-out bar 89 which pulls down vertical rod 80. The downward movement of vertical rod 80 causes the slot 81 in the upper end thereof, to move downward relative to pin 82 which is connected to crank arm 85 of the seat pan frame 9; thereby pin 82 is free to move in the slot 81 for permitting the spring biased seat to automatically raise to the retracted position when unoccupied.

During the final phase of folding the front wheel support linkage mechanism, the transverse bar 60 functions to lock the linkage mechanism in the folded position in the following manner: the transverse bar 60, as shown in FIG. 4, has arms 61 at right-angles thereto which have a catch slot 63 that engages and attaches to the horizontal pin 64 fixed at a forward position to the rear support leg 19.

While only a particular embodiment has been disclosed herein, it will be readily apparent to persons skilled in the art that numerous changes and modifications can be made thereto, including the use of equivalent means and devices without departing from the spirit of the invention.

The embodiments of the invention in which an exclusive property or privilege is claimed are defined as follows:

What is claimed is:

1. A wheelchair assembly, comprising: a back frame having a pair of parallel, vertically elongated side frame members and horizontal frame members secured between said side frame members for forming a rigid back frame structure which is adapted to be secured to a support member; seat pan frame extending horizontally forward from said back frame when in a position for occupancy and being pivotally supported at its aft end to said back frame for upward rotary movement to a vertical storage position; rear support legs formed by a lower section of said back frame, below the pivotal connection of said seat pan frame; front support legs comprising a folding linkage mechanism supportably mounted to the lower section of said back frame independently of said seat pan frame and forwardly extendable therefrom, for forming the front support legs when said linkage mechanism is locked in a forward extended position and being foldable substantially parallel to said back frame while in a retracted position; and wheels mounted to the lower ends of the front and rear support legs for rolling movement of the chair configuration, wherein said wheelchair assembly is usable either as a wheelchair, with said front support legs being forwardly extended, or as a seat with said front support legs in the retracted position and said back frame being secured to the support member.

2. A wheelchair assembly as set forth in claim 1, including: a footrest platform extending horizontally forward and being pivotally mounted at its rear end from the lower end of the front support legs for rotation about a transverse axis to a folded position lying against the front support legs.

3. A wheelchair assembly as set forth in claim 1, including: side armrests retractably stowed onto said seat pan frame and being extendably raised and spaced parallel to said horizontally extending seat pan frame; said side armrests having their rear ends releasably inserted into slotted openings formed in the side frame members of said back frame for support in a horizontal, outward-extended, armrest position.

4. A wheelchair assembly as set forth in claim 1, including: attendant assist handles pivotally mounted to the back frame for movement between a rearward extended, attendant assist position and a downward, vertically aligned retracted position, adjacent to said pair of vertically parallel side frame members.

5. A wheelchair assembly as set forth in claim 1, wherein: said front wheels being mounted for fixed directional alignment and said rear wheels being caster mounted for providing directional steering control of the wheelchair.

6. The combination of a folding seat and a folding wheelchair configuration, comprising: a back frame having a pair of vertically parallel side frame members and transverse frame members secured between said pair of side frame members for integrally forming a rigid back frame; latch means for removably securing said back frame to a wall which serves as connective support structure when the folding seat configuration is utilized; a seat pan frame extending horizontally forward from said back frame when in a lowered position for occupancy and being pivotally supported at its aft end to said back frame for limited articulation between a forward extended, horizontal position for occupancy and an upward rotated vertical position for stowage; said back frame being detached through said latch means from the wall for forming a self-supporting wheelchair configuration; rear support legs formed by a lower section of said back frame, below the pivotal connection of said seat pan frame; front support legs, for the unfolded wheelchair configuration, comprising a folding linkage mechanism supportably mounted to the lower section of said back frame and forwardly extendable therefrom, independently of said seat pan frame, for forming the front support legs when said linkage mechanism is locked in a forward extended position and being foldable substantially parallel to said back frame while in a retracted position: and wheels mounted to the lower end of the front and rear support legs for rolling movement of the unfolded wheelchair configuration wherein said front support legs are in the retracted position when said back frame is secured to the wall and said seat pan frame is in the lowered position for occupancy.

7. The combination of a folding seat and a folding wheelchair configuration, as set forth in claim 6, including: a footrest platform extending horizontally forward and being pivotally mounted at its rear end from the lower end of the front support legs for rotation about a transverse axis to a folded position lying against the front support legs.

8. The combination of a folding seat and a folding wheelchair configuration, as set forth in claim 6, including: side armrests retractably folded against said seat pan frame and being extendably raised and spaced parallel to said horizontally extending seat pan frame; said side armrests having their rear ends detachably connected to the side frame members of said back frame for support in a horizontal, outwardextended, armrest position; a locking device, fixedly attached to side frame members of said back frame for detachably connecting the rear ends of said horizontally extending armrests; and a link brace having one end connected to intermediate length of armrest and other end connected to seat pan frame for forming a support brace for the side armrests when in the raised position.

9. The combination of a folding seat and a folding whellchair configuration, as set forth in claim 6, including: attendant assist handles pivotally mounted to the back frame for movement between a rearward extended, attendant assist position and a downward, vertically aligned retracted position, adjacent to said pair of vertically parallel side frame members.

10. The combination of a folding seat and a folding wheelchair configuration, as set forth in claim 6, wherein said front wheels are mounted for fixed directional alignment and said rear wheels being caster mounted for providing directional steering control of the wheelchair.

* * * * *